United States Patent [19]

Roca et al.

[11] Patent Number: 5,629,826
[45] Date of Patent: May 13, 1997

[54] RETRACTABLE CORD SURGE PROTECTOR

[75] Inventors: Robert Roca, Los Angeles, Calif.;
Richard J. Tremmel, Secaucus, N.J.;
Edward L. Hames, Peterborough,
N.H.; John Peterson, Hollywood,
Calif.; Eric Parker, Los Angeles,
Calif.; Bernd H. Wiegandt, Long
Beach, Calif.

[73] Assignee: Curtis Computer Products, Inc., Mustatine, Iowa

[21] Appl. No.: 565,003

[22] Filed: Nov. 30, 1995

[51] Int. Cl.[6] .................................................. H02H 1/00
[52] U.S. Cl. ........................... 361/118; 361/111; 361/119
[58] Field of Search ................................ 361/56, 91, 111, 361/118, 119, 127; 242/107.11

[56] References Cited

U.S. PATENT DOCUMENTS

| | | | |
|---|---|---|---|
| 3,854,017 | 12/1974 | Crim | 242/107 |
| 5,114,091 | 5/1992 | Peterson et al. | 242/107 |

Primary Examiner—Jeffrey A. Gaffin
Assistant Examiner—Stephen W. Jackson
Attorney, Agent, or Firm—Richard P. Crowley

[57] ABSTRACT

An inexpensive, compact, portable, retractable cord, visual indicator, electrical/telephone connector-type surge protector, which comprises a housing composed of a molded plastic, with two female receiving grounding inlets on its upper surface, a visual indicator light, and a pair of female telephone inlets on one side. On another side, the housing has two openings for a retractable electrical extension cord and a retractable telephone cord. On the opposite side of the housing are two independent, retaining, on-off switches for the two cords. The housing is composed of two sections, an upper and lower section, with an inner spring coil mechanism on two independent reels in each section for the electrical and telephone cords respectively. The invention is designed to be used with standard electrical apparatus or other sensitive electrical devices, which are to be protected from electrical surges, where extension cords may be required, and allows for the retraction of the cords when not required.

16 Claims, 6 Drawing Sheets

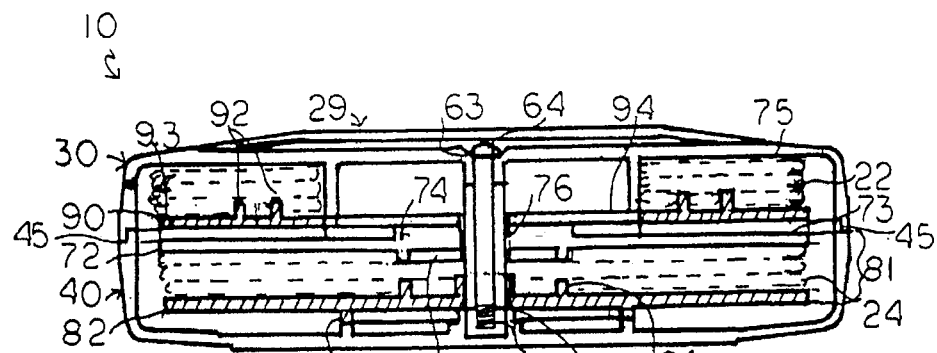
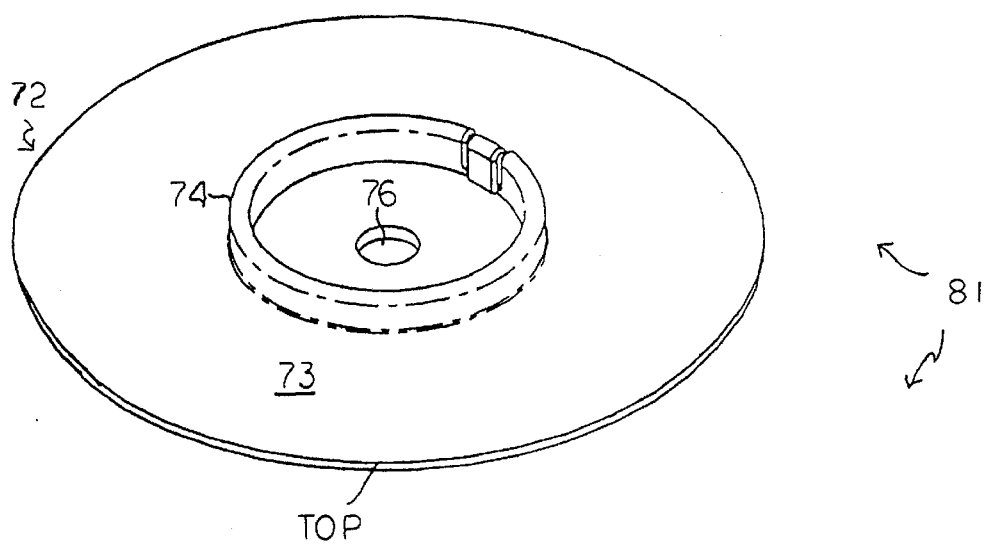
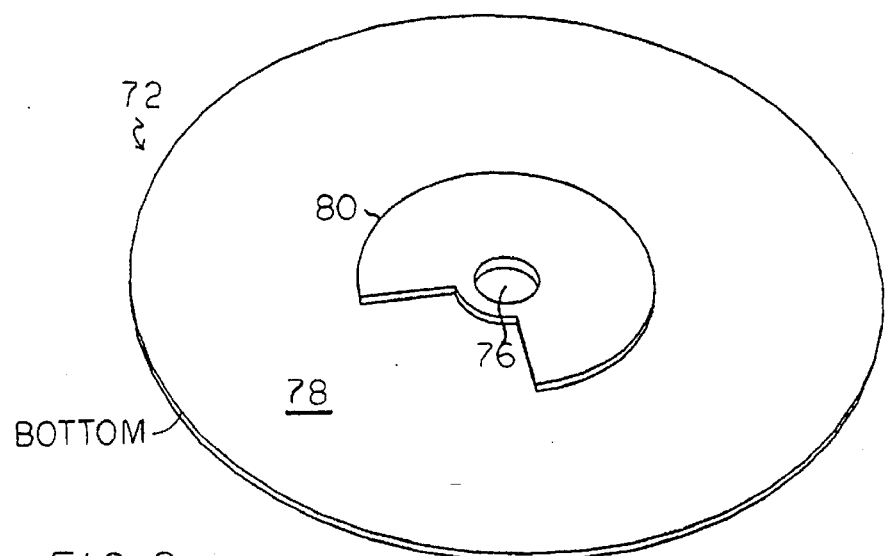
FIG. 9

RETRACTABLE CORD SURGE PROTECTOR

BACKGROUND OF THE INVENTION

Electrical surge protectors are well-known devices which are designed to prevent a sensitive electronic or electrical device from damage on the occurrence of electrical surges from the electrical power source to which the sensitive electronic and electrical device is connected for use. Generally, surge protectors are adapted to be plugged into a standard electrical outlet and to be positioned between the source of electrical power and the sensitive electronic or electrical device to be protected from electrical surges.

Electrical surge protectors with elongated electrical cords are often employed at work stations, in situations where more than one type of cord is present; for example, in use with a computer which may require more than one electrical cord or connecting cable, and often including a telecommunications cord for use with a telephone or modem.

At a work station where more than one cord, or multiple, elongated extended cords are present, such elongated cords may get tangled or knotted in use. To avoid this situation, which may adversely affect use of the electrical and/or telecommunication equipment, the cords may be coiled manually and secured to prevent tangling, which may create weighty and unsightly cord groupings around the work station. Further, securing or tying the cords restricts the flexibility of movement for the computers and/or telecommunications equipment. When computers are moved, the cord groupings must be unsecured to allow for the new location of the computer, relative to the electrical and/or telecommunications power source.

Further, electrical cords and signal cord power sources may often be in different locations, requiring manual coiling of one cord and extension of the other.

Therefore, it is desirable to provide for a simply manufactured, inexpensive, retractable cord surge protector that has improved flexibility of use and avoids the problems associated with prior art surge protectors.

SUMMARY OF THE INVENTION

The invention concerns a biased, retractable, multiple cord electrical power device, and particularly to a portable, electrical power-telephone retractable multiple cord device, for use with two or more electrical cords, or telephone cords, and optionally any combination thereof, which may be retracted independently into a housing by means of a dual reel system within the housing. The surge protector device with a visual surge indicator is located at one end of the housing, and outlets are located on the housing for one or more electrical and/or telephone cords.

The invention relates to a retractable multiple cord electrical power device, which comprises an arcuate, reel-type housing having an interior surface arranged and constructed to receive and retain at least two cords, independently coiled on biased cord reels, in a coiled arrangement within the housing. At least one of the cords is an electrical power cord, in a coiled, generally side-by-side relationship within the housing, the cord having a first and second end, the first end of the electrical cord having a connector for the connection of electrical power from an electrical power source. The second cord, also coiled within the housing, has a first and second end, and the first end of the second cord has a connector for connection with a telecommunications signal source.

The main housing is an arcuate, reel-type housing with a main reel having a top and bottom section snug fit within the bottom half of the housing. A second reel above the main reel also has a bottom reel section, with the top of the reel housing being the top reel section of the second reel.

Independent reels for biased coiling of the cords are located within the interior surface of the housing and are connected to each cord to permit each cord independently to move between a non-use, coiled position within the housing and a use, extended position outside of the housing.

The electrical/signal wiring section of the housing extends outwardly from the arcuate reel housing on one side and includes the electrical connection on an axial face of the exterior and telephone connectors on a radial face of the exterior housing. An exterior means on the wiring housing is connected to the second end of each cord for the respective connection of each cord to an electrical power and signal source.

At least two independent, releasable, cord-retaining on-off switches provide for the retention of each cord independently in an extended use position. The releasable cord retaining switches include a pair of generally parallel, spaced-apart, finger operated, friction-engaging, cord-retaining switches on the reel housing. Upon release of the independent cord retention switches, either one or both of the retractable cords may be retracted into the housing.

The interior surface of the surge protector housing contains a first and second spring-coil cord reels, each with an inner surface to receive a coiled cord therein and constructed and arranged to move independently of each other. The two housing sections may be fastened together to form the first and second reel cord housing by being snap-fit together, or may be fastened with a threadable fastener extending from the top reel housing section into the bottom housing section, through an opening in the middle of the reel housings. If the threadable fastener is used, a cover is snap-fit over the exposed fastener onto the upper reel housing to provide a smooth, uniform upper reel housing surface and improved aesthetic appearance.

In a preferred embodiment, The cords in the housing includes a first electrical cord and a second telephone cord. The invention includes a surge protector visual indicating light on the exterior power and signal wiring housing to protect the electrical cord or cords from electrical surges from the power source. In an optional embodiment, additional visual indicator lights to indicate power or signal variations may be added to the device.

The invention includes an electrical cord having a male plug connector at the first end and a multiple female connector at the second end, connected to the wiring within the power and signal wiring housing. The invention includes a telephone cord having a telephone male connector plug at the first end for insertion into a female telephone jack and a multiple female connector on the exterior of the second end, connected to the wiring within the power and signal wiring housing.

Two integrally molded recessed areas are located on the housing to provide a reel guide for the electrical cord or cords and/or telephone cord respectively.

While the preferred embodiment shows a retractable electrical cord and retractable telephone cord, it is recognized that optional combinations, such as two electrical cords or two telephone cords, may be used. In addition, an optional embodiment could include a reel housing constructed and adapted to contain more than two reels for more than two cords of varying types.

The invention will be described with reference to certain, particular embodiments; however, it is recognized that those persons skilled in the art may make various changes, modifications, additions and improvements to the retractable cord surge protector as described, all without departing from the spirit and scope of the invention.

BRIEF DESCRIPTION OF THE DRAWINGS

FIG. 8 shows a sectional view of the retractable cord surge protector of the FIG. 5 cut along the lines 8—8.

FIG. 9 shows a perspective view of the top section of the main reel of the invention.

DESCRIPTION OF THE EMBODIMENTS

Figure 1:
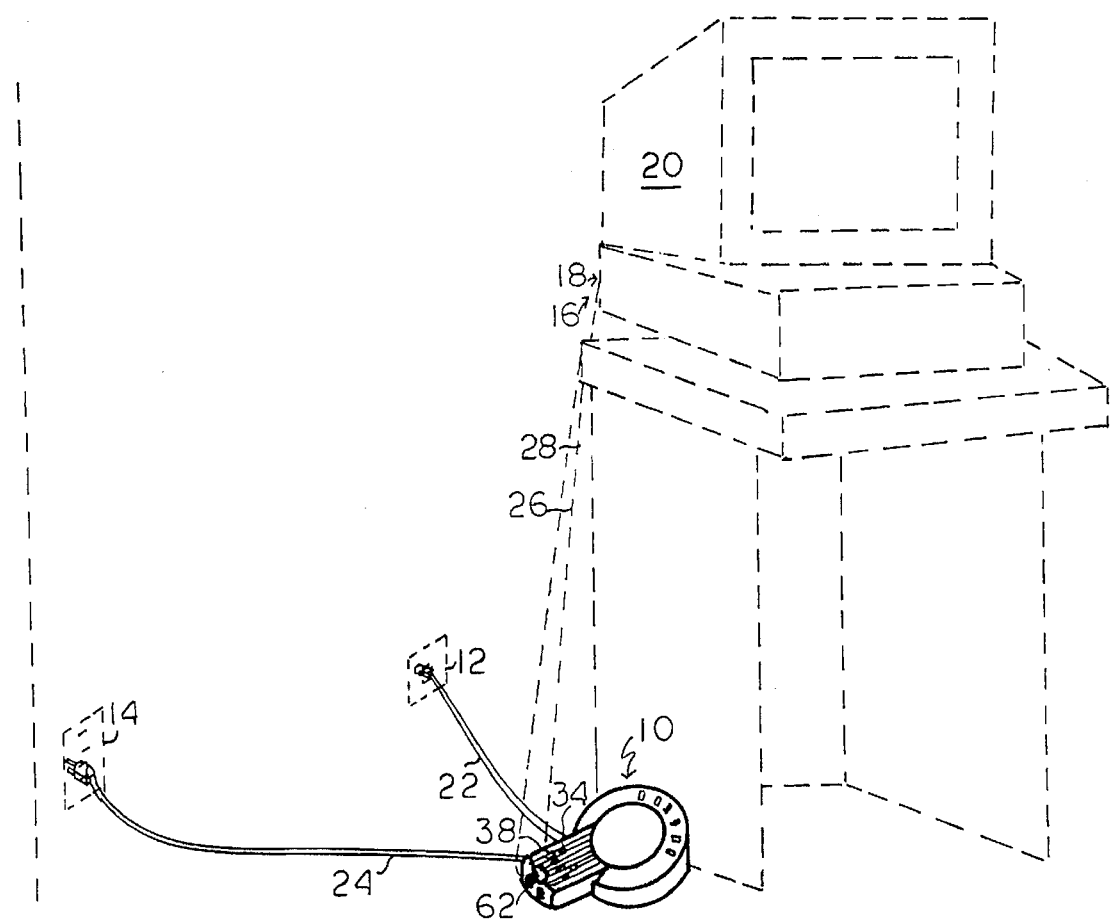
FIG. 1 shows the retractable cord surge protector of the invention in use with a wall outlet and computer.

In the drawings, FIG. 1 shows the retractable cord surge protector of the invention 10 in a use position, placed on a floor at a work station. The telephone cord 22 and electrical cord 24 are shown plugged into wall outlets 12 and 14 respectively. A computer 20 with a modem 18 is shown, with the computer cord 28 and telephone cord 26 extending into the inlets 34, 38 and 62 of the surge protector 10 respectively.

Figure 2:
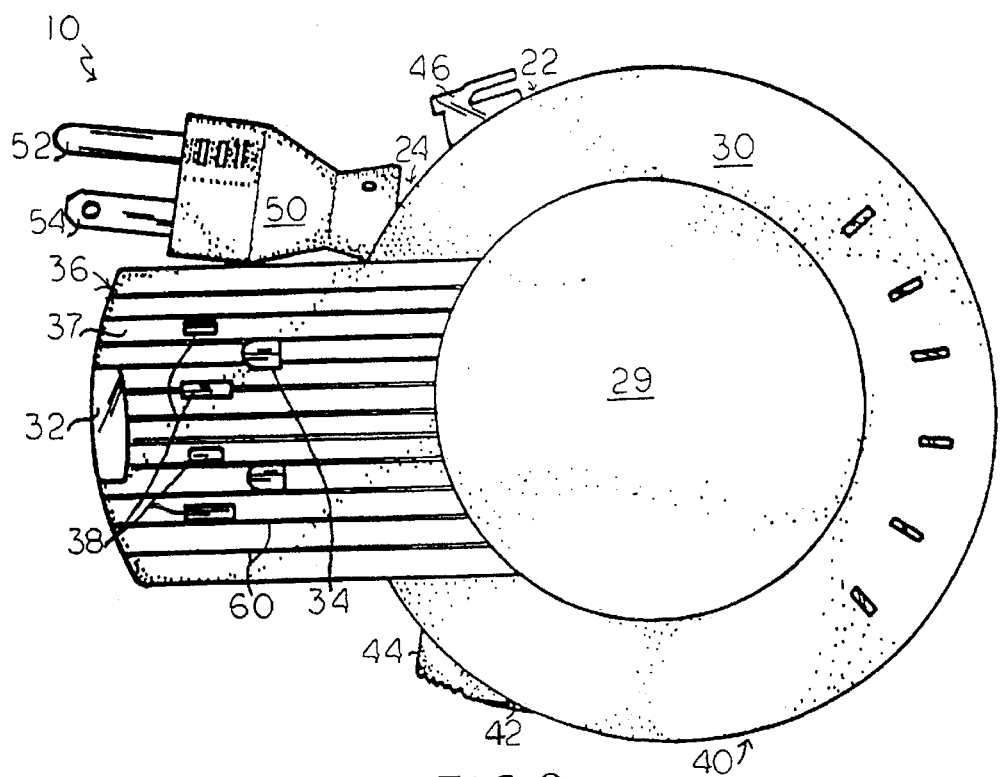
FIG. 2 shows a top plan view of the invention of FIG. 1.

FIGS. 2–7 illustrate in detail the outer housing of the invention of FIG. 1 in detail. FIG. 2 is a top plan view of the invention 10, with the arcuate upper reel housing 30 and reel housing top insert 29 secured thereto. The surge protector power and signal wiring housing 36 is integrally molded with and extends outwardly from the arcuate reel housing 30, and has friction ridges 60 on its top surface 37. Female grounding inlets 34 and a pair of female electrical inlets 38 are also located on the top surface 37. A visual indicator light 32 is shown at the outer end of the surge protector housing 36.

On one side of the upper reel housing 30 is shown the telephone connector 46 on telephone cord 22, which extends outwardly from a cord storage recess 58 (not seen in this figure). An electrical plug 50, with male grounding prong 52 and male electrical prongs 54, is shown extending from the cord housing recess 56 (not seen in this figure).

Figure 3:
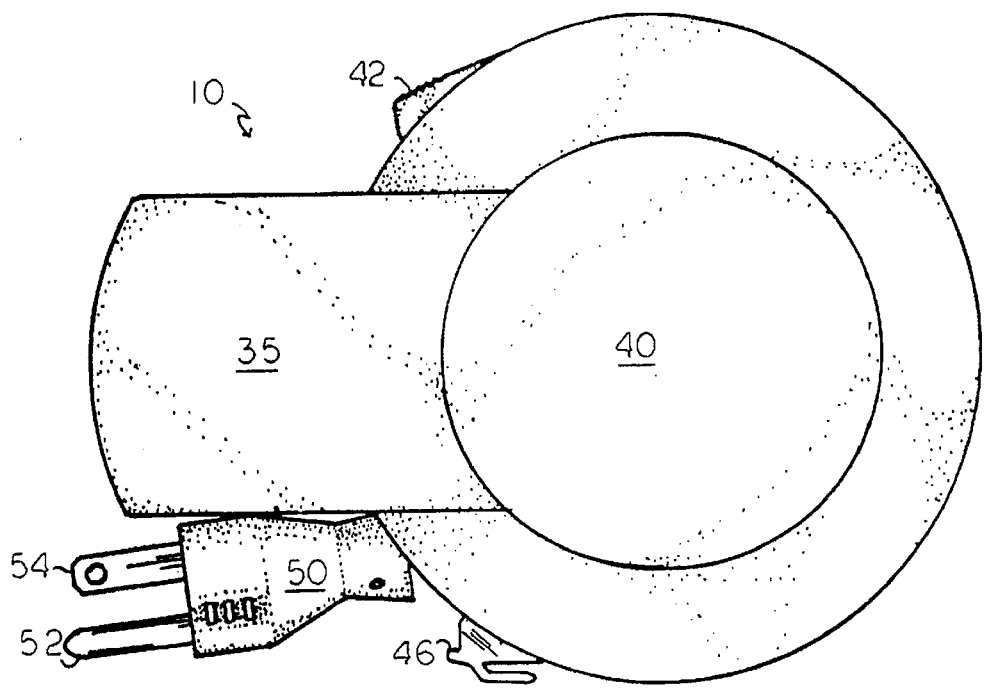
FIG. 3 shows a bottom plan view of the invention of FIG. 1.

FIG. 3 shows a bottom plan view of the invention 10, with the lower arcuate reel housing 40 being integrally formed with the lower surge protector power and signal wiring housing 35. The telephone connector 46 and electrical cord outlet 50 with male grounding prongs 52 and male electrical prongs 54 are also shown. Cord-retaining on-off switch 42 is also shown.

Figure 4:
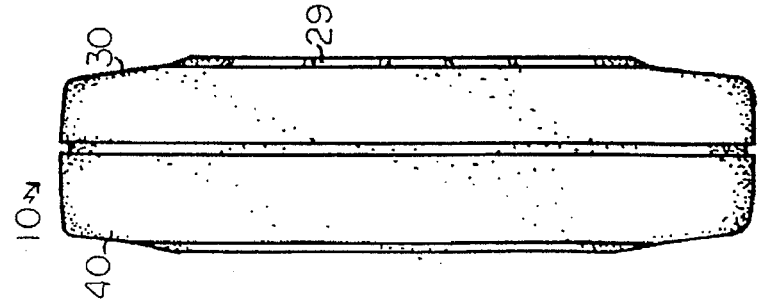
FIG. 4 shows a rear elevational view of the invention of FIG. 1.

FIG. 4 shows a rear elevational view of the invention 10, with the lower arcuate reel housing 40 snap-fit into the arcuate upper reel housing 30. The upper reel housing 30 has the top insert 29 snap fit thereon.

Figure 5:
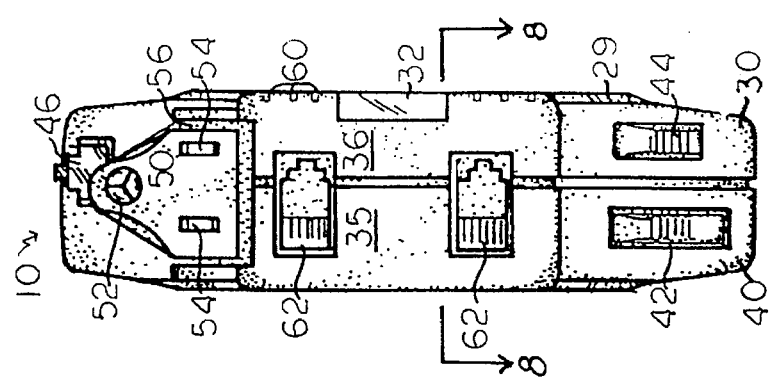
FIG. 5 shows a front elevational view of the invention of FIG. 1.

FIG. 5 shows a front elevational view of the invention 10, with the upper reel housing 30 having the top insert 29 thereon. The lower reel housing 40 has one cord-retaining on-off switch 42 located thereon, and a second cord-retaining on-off switch 44 is shown on upper reel housing 30. The telephone cord connector 46 and the electrical cord 24 and plug 50, with male grounding prongs 52 and male electrical prongs 54, is shown within recess 56. Visual surge indicator signal 32 and signal inlets 62 are shown on the outer surface of housing 35, 36.

Figure 6:
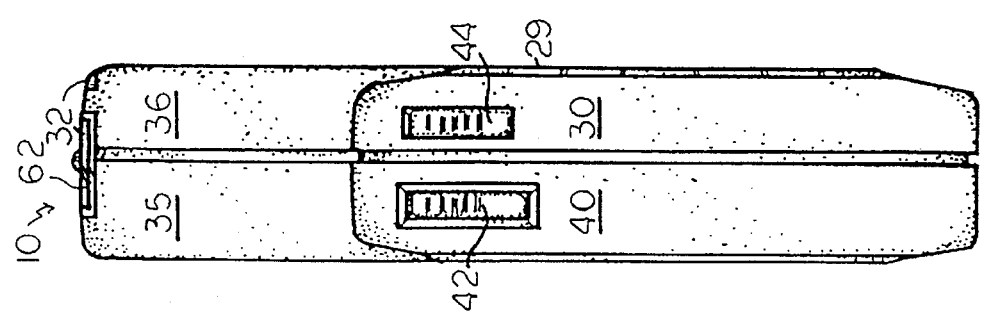
FIG. 6 shows a side elevational view of the invention of FIG. 1.

FIG. 6 shows a side plan view of the invention 10, with the upper surge protector power and signal wiring housing 36 having the visual surge indicator signal 32 on the outer end, as well as the signal inlet 62. The lower reel housing 40 is shown with one cord-retaining on-off switch 42 located thereon, and the second cord-retaining retaining on-off switch 44 is shown on upper reel housing 30. Upper reel housing 30 also has the top insert 29 thereon.

Figure 7:
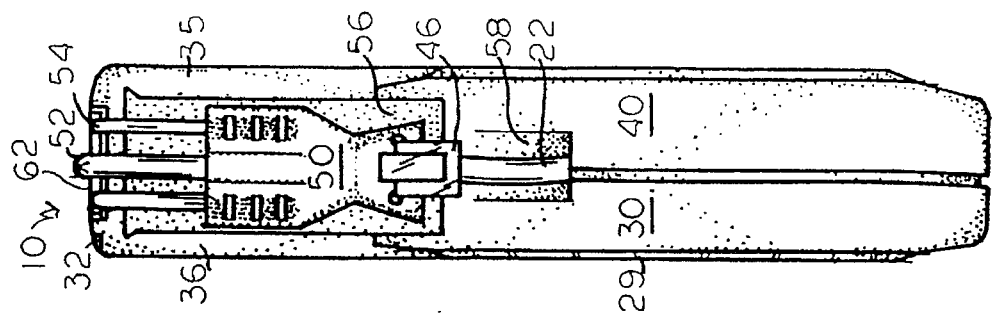
FIG. 7 shows a side elevation view of the other side of the invention of FIG. 1.

FIG. 7 is a side plan view of the other side of the invention 10, showing the retracted plug 50, with male grounding prongs 52 and male electrical prongs 54, inside recess 56, and the telephone connector 46 and telephone cord 22 retracted into recess 58. FIG. 7 is also shown with the upper surge protector power and signal wiring housing 36 having the visual surge indicator signal 32 on the outer end, as well as the signal inlet 62.

FIG. 8 shows a sectional view of the invention 10, with the upper 30 and lower 40 reel housings secured together at outer edges 45 in a snap-fit manner. The upper telephone reel 90 is shown with a telephone cord 22 reeled thereon, the cord shown in broken line. The central opening 94 of reel 90 is constructed and adapted to fit inside the interior surface 75 of the top reel housing 30, which top reel housing provides the upper surface for the telephone reel. Coiling mechanisms 92 and 93 are also shown.

The lower reel housing 40 contains the main reel 81 with upper reel section 72, having coiling mechanisms 74 and 80, and fastener opening 76. and lower 82 reel section, having coiling mechanisms 84 and 86 on the upper and lower surfaces, and fastener opening 76, having electrical cord 24 reeled thereon, the electrical cord 24 shown in broken line. The threaded fastener 64 is also shown inserted through an opening 63 in the top reel housing 30 and into a threaded opening 70 in the bottom reel housing 40. Insert 29 is shown covering the fastener 64.

FIG. 9 shows a perspective view of the upper 73 and lower 78 surfaces of the top surface of the main reel 81, with the coiling mechanisms 74 and 80, and fastener opening 76.

Figure 10:
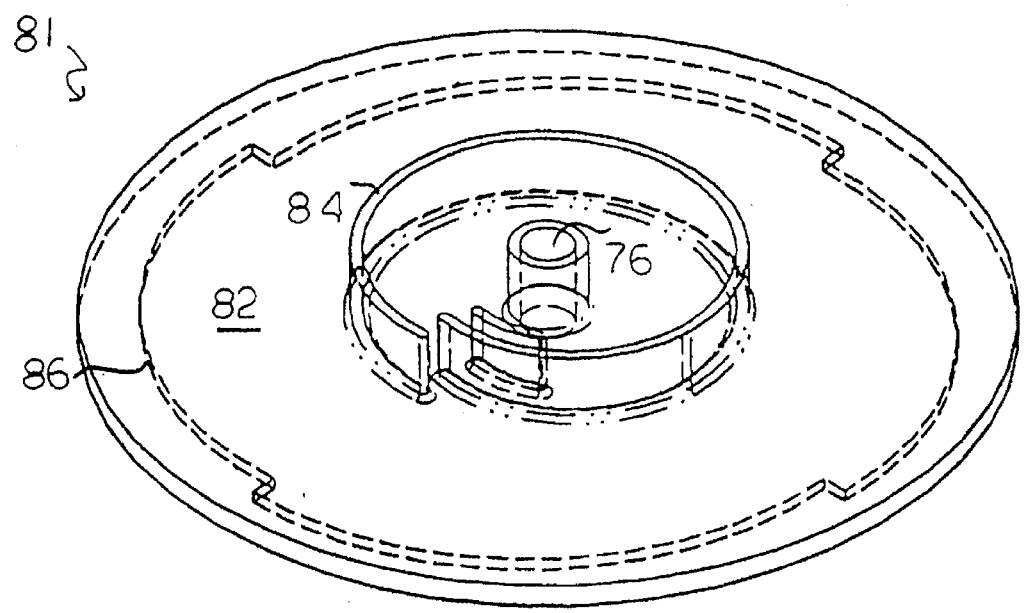
FIG. 10 shows a perspective view of the bottom section of the main reel of the invention.

FIG. 10 shows a perspective view of the upper surface 82 of the bottom section of the main reel 81, with coiling mechanisms 84 and 86 on the upper and lower surfaces of reel 82, and fastener opening 76.

Figure 11:
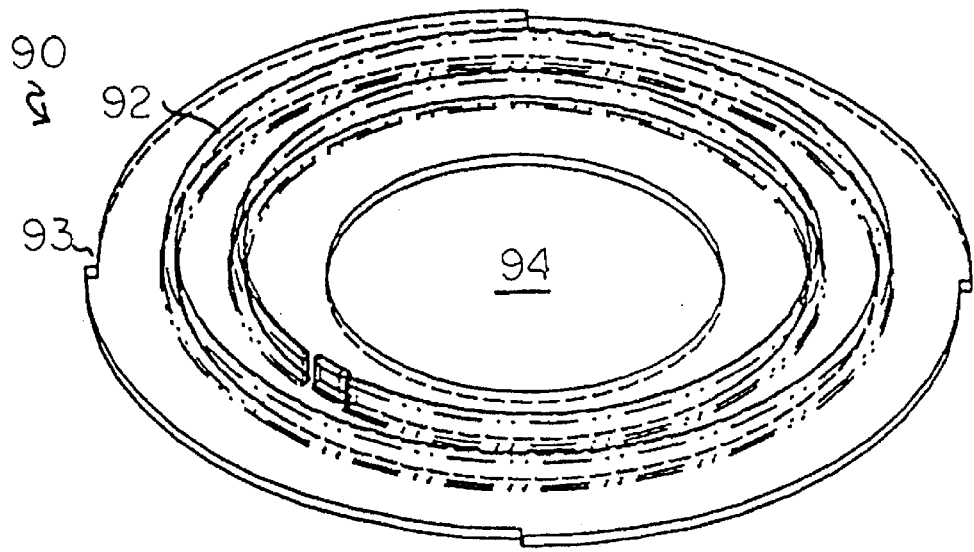
FIG. 11 shows a perspective view of the telephone reel bottom section.

FIG. 11 shows a perspective view of the upper surface of the bottom section of the telephone reel 90. The central opening 94 is constructed and adapted to fit inside the interior surface 75 of the top reel housing 30, which top reel housing provides the upper surface for the telephone reel. Coiling mechanisms 92 and 93 are also shown.

Figure 12:
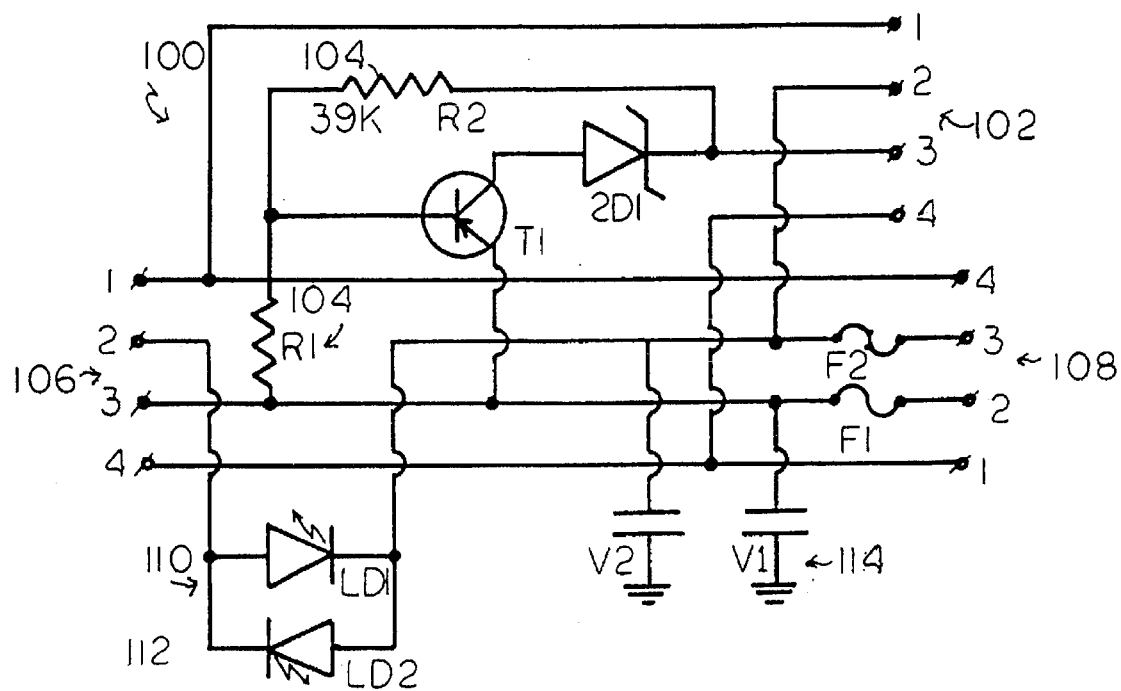
FIG. 12 shows a schematic electrical diagram of the retractable cord surge protector of the invention.

FIG. 12 is an electrical diagram 100 of the surge protector of the invention 10, showing the circuitry for the telephone signal lines 102, the two on-off retaining switches 104, the electrical input lines 108, and outlet lines for power and signals 106. Also shown is visual light indicator circuitry 110, with optional additional circuitry 112, and surge protector circuitry 114.

In use, the second end of the electrical cord 24 is wired into the power and signal wiring in the exterior power and signal wiring housing 35, 36 and coiled around the bottom section 82, retained by retainer 84, of the main reel 81. Coiling mechanism 86 on the bottom of reel 82 allows for biasing of the reel. The first end of the electrical cord 24 with male connector 50 is then placed at the entrance opening in the recess area 56 on the main reel housing 30, 40. The top section of the main reel 81 is then secured thereon, with coiling mechanism 80 on the bottom surface 78 of the top section 72 of the main reel 81 further retaining the cord 24. The bottom section of the telephone reel 90 is then placed on top of the top section of the main reel 81. The second end of the telephone cord 22 is then connected to the telephone wiring in the power and signal wiring surge protector housing 35, 36 and coiled in a biased manner around the top reel 90. The first end of the telephone cord 22, with the connector 46 thereon, is threaded through an opening in the reel housing 30, 40 and placed in the telephone cord recess 24. The top arcuate reel housing 30 is then secured by snap-fitting the outer edges 45 together, and additionally and optionally by means of a threadable fastener of FIG. 8, to the bottom arcuate reel housing 40, which fastening also secures and positions the two cord reels for use.

Two cord-retaining on-off switches 42, 44 are also connected internally to the wiring and located on the reel housing. The releasable, cord retaining, on-off switches are a pair of generally parallel, spaced-apart, finger operated, friction-engaging, cord-retaining on-off switches for independently retaining the cords as desired.

As assembled, the invention may be placed between a power and signal source and a work station and connecting cords from the work station are plugged into the retractable cord surge protector. As needed, one or both of the cords may then be extended independently to be plugged into a power source.

Thus, the invention provides for a retractable cord surge protector device for a work station, which includes a cord for telephone signal contact. The cords can be independently retracted or retained in an extended position as desired. The two independent reels within the housing prevent tangling of the cords within the housing, and the retracting ability provides for flexibility and improved use of cords at a work station, where tangling of extended cords or cords with different length requirements can create confusion. The invention further provides for improved aesthetic appearance and storage capabilities for the surge protector device. The invention may be adapted for a variety of power and signal supply needs as desired.

What is claimed is:

1. A retractable multiple cord electrical power device, which comprises:
    a) an arcuate reel housing having an interior surface arranged and constructed to receive and retain at least two cords in a coiled arrangement within the housing;
    b) at least a first and a second cord means, one of which is an electrical power cord, said first and second cords in a coiled, generally side-by-side relationship within said housing, each cord having a first and second end, said first end of said electrical cord having a connector for the connection of electrical power from an electrical power source, said first end of said second cord having a connector for connection with a signal source;
    c) biasing means in said housing and connected to each cord to permit said cords independently to move between a non-use, coiled position within said housing and a use, extended position outside of said housing;
    d) connection means on said housing connected to said second end of said first and second cord and adapted for the respective connection of said first and second cords to an electrical power and signal source respectively; and
    e) at least a first and second releasable cord retention means to provide for the retention of each cord independently in an extended use position.

2. The device of claim 1 wherein said cord means comprises a first electrical cord and a second telephone cord.

3. The device of claim 1 which includes a visual power signal means on said exterior housing to indicate electrical or signal power to said exterior connection means.

4. The device of claim 1 which includes a surge protector means to protect electrical devices connected to the exterior connection means from electrical surges from the power source.

5. The device of claim 1 wherein said cord means includes an electrical cord having a grounded male plug connector at said first end and at least one female connector at said second end connected to the exterior connection means.

6. The device of claim 1 wherein said cord means includes a telephone cord having a telephone male connector plug at said first end for insertion into a female telephone jack and a multiple female connector at said exterior connection means of said second end connected to the exterior connection means.

7. The device of claim 1 wherein the exterior connection means extends outwardly from said reel housing on one side and includes the electrical connection on either an axial or radial face of the exterior means and signal connections on a different radial or axial face on the exterior means.

8. The device of claim 1 wherein the releasable cord retractor means comprises a first and second generally parallel, spaced-apart, finger-operated, friction-engaging, cord-retaining, on-off switches on the housing.

9. The biasing means of claim 1 which includes at least two separate, independently movable, cord reels with inner spring coil means.

10. The device of claim 1 wherein said housing comprises:
    a) a first and second reel housing, each with an interior surface adapted to receive at least one coiled cord therein; and
    b) means to retain said first and second reel housing together to form said reel housing.

11. The device of claim 10 wherein the first reel housing has a generally circular cover secured over the interior.

12. In combination:
    a) an electrical power source;
    b) a signal source; and
    c) a retractable multiple cord electrical power device, which device comprises:
        i) an arcuate reel housing having an interior surface arranged and constructed to receive and retain at least two cords in a coiled arrangement within the housing;
        ii) at least a first and a second cord means, one of which is an electrical power cord, said first and second cords in a coiled, generally side-by-side relationship within said housing, each cord having a first and second end, said first end of said electrical cord having a connector for the connection of electrical power from an electrical power source, said first end of said second cord having a connector for connection with a signal source;

iii) biasing means in said housing and connected to each cord to permit said cords independently to move between a no-use, coiled position within said housing and a use, extended position outside of said housing;

iv) exterior connection means on said housing connected to said second end of said first and second cord for the respective connection of said first and second cords to an electrical power and signal source respectively; and v) at least a first and second releasable cord retention means to provide for the retention of each cord independently in an extended use position, with at least one of the cords in an extended use position and connected to a source.

13. The combination of claim 12 wherein the device includes an electrical cord and a separate telephone cord, the electrical cord connected to the electrical power source and the telephone cord connected to the signal source.

14. The combination of claim 13 which includes a surge protector to protect the electrical devices connected to the exterior connection means from electrical surges from the power source.

15. The combination of claim 14 which includes a computer connected to the electrical exterior connection means and a modem connected to the signal exterior connection means.

16. A retractable multiple cord electrical power device, which comprises:

a) an arcuate reel housing having an interior surface arranged and constructed to receive and retain at least two cords in a coiled arrangement within the housing;

b) at least a first and a second cord means, one of which is an electrical power cord, said first and second cords in a coiled, generally side-by-side relationship within said housing, each cord having a first and second end, said first end of said electrical cord having a connector for the connection of electrical power from an electrical power source, said first end of said second cord having a connector for connection with a signal source;

c) biasing means in said housing and connected to each cord to permit said cords independently to move between a non-use, coiled position within said housing and a use, extended position outside of said housing;

d) exterior means on said housing connected to said second end of said first and second cord for the respective connection of said first and second cords to an electrical power and signal source respectively;

e) at least a first and second releasable cord retention means to provide for the retention of each cord independently in an extended use position; and f) a surge protector means to protect electrical devices connected to the exterior connection means from electrical surges from the power source.

* * * * *